(12) United States Patent
Li

(10) Patent No.: US 12,140,967 B2
(45) Date of Patent: Nov. 12, 2024

(54) MULTI-ROBOT ROUTE PLANNING

(71) Applicant: Rapyuta Robotics Co., Ltd., Tokyo (JP)

(72) Inventor: Wen Zheng Li, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 439 days.

(21) Appl. No.: 17/460,649

(22) Filed: Aug. 30, 2021

(65) Prior Publication Data

US 2023/0063370 A1 Mar. 2, 2023

(51) Int. Cl.
| | | |
|---|---|---|
| *G05D 1/02* | (2020.01) | |
| *G05D 1/00* | (2024.01) | |
| *G06Q 10/04* | (2023.01) | |
| *G06Q 10/047* | (2023.01) | |
| *G06Q 10/06* | (2023.01) | |
| *G06Q 10/0631* | (2023.01) | |
| *G06Q 10/08* | (2023.01) | |
| *G06Q 50/28* | (2012.01) | |

(52) U.S. Cl.
CPC ......... *G05D 1/0297* (2013.01); *G05D 1/0088* (2013.01); *G05D 1/0212* (2013.01); *G06Q 10/047* (2013.01); *G06Q 10/06315* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 11,163,314 B1* | 11/2021 | Bell | G05D 1/0289 |
| 2011/0158232 A1* | 6/2011 | Nesbitt | G01C 21/34 370/389 |
| 2017/0004406 A1* | 1/2017 | Aghamohammadi | B25J 9/1666 |
| 2019/0217857 A1* | 7/2019 | Sorin | G05D 1/0274 |
| 2020/0097022 A1* | 3/2020 | Miki | G05D 1/0291 |
| 2021/0132627 A1* | 5/2021 | Aisu | G08G 1/22 |
| 2021/0341309 A1* | 11/2021 | Yuan | G01C 21/3614 |
| 2022/0057803 A1* | 2/2022 | Sorin | G05D 1/0088 |
| 2022/0366364 A1* | 11/2022 | Otsuki | G08G 1/202 |

* cited by examiner

*Primary Examiner* — Amelia Vorce
*Assistant Examiner* — Kyle S Park
(74) *Attorney, Agent, or Firm* — Trupti P. Joshi

(57) ABSTRACT

The disclosure provides a method and system for multi-robot route planning. The method includes determining a route plan of a node based on an order value associated with the node, wherein the order value is distance travelled from the node to one or more nodes in a network, occupying an order slot from a list of orders of the node. The determined route plan of the node is sent to the one or more nodes in the network and a new route plan is generated, based on order value threshold and wait time estimate associated with the node. The method includes optimizing the generated new route plan of the node comprising computing a new order value occupying a new order slot from the list of orders of the node in parallel to change in status of order value of the one or more nodes.

20 Claims, 6 Drawing Sheets

MULTI-ROBOT ROUTE PLANNING

TECHNICAL FIELD

The disclosure herein generally relates to robots, more particularly, to multi-robot route planning.

BACKGROUND

Planning routes for large numbers of robots in a small confined space, particularly where multiple autonomous mobile robots can fit through space at a time, have not received industrial recognition. Robotics solution providers tried to handle similar problems by designing robots to force the robots to follow certain lines, predictably moving the robots, assuming nothing is around them. For such systems, there is not much need for route planning. Further, such systems cannot be scaled and do not integrate with existing warehouse designs. Such systems face problems wherein re-planning routes becomes cumbersome, reconfiguring is challenging at the infrastructure level, and no obstacles can interfere with them. Whenever new robots are added to such or any other systems, the input space blows exponentially; hence, the existing systems have not kept up with the scale of increase in robots. This scenario leads to a combinatorial problem, and it becomes difficult for the system to match as robots are scaled up.

SUMMARY OF THE INVENTION

The accompanying drawings, which are incorporated in and constitute a part of this disclosure, illustrate exemplary embodiments and, together with the description, serve to explain the disclosed principles.

Embodiments of the present disclosure present technological improvements as solutions to one or more technical problems recognized by the inventors in conventional systems. For example, in one embodiment, a processor implemented a method for multi-robot route planning. The method includes determining, by a multi-route robot planner, a route plan of a node based on an order value associated with the node, wherein the order value is a measure of distance from the node to one or more nodes in a network, occupying an order slot from a list of orders of the node. The method further includes sending, by a multi-route robot planner, the determined route plan of the node to the one or more nodes in the network. The method further includes generating, by a multi-route robot planner, a new route plan, in response to sending the determined route plan to one or more nodes, wherein the new route plan is generated based on order value threshold and wait time estimate associated with the node; and the method further includes optimizing, by a multi-route robot planner, the generated new route plan of the node to obtain an optimized new route plan, wherein the optimization comprises computing a new order value occupying a new order slot from the list of orders of the node in parallel to change in status of order value of the one or more nodes.

In another embodiment, a system for multi-robot route planning is provided. The system includes a memory storing instructions, and one or more hardware processors coupled to the memory via the one or more communication interfaces. The one or more hardware processors are configured by the instructions to determining, by a multi-route robot planner, a route plan of a node based on an order value associated with the node, wherein the order value is a measure of distance from the node to one or more nodes in a network, occupying an order slot from a list of orders of the node. The system is further configured to send the determined route plan of the node to the one or more nodes in the network. The system is further configured to generate a new route plan, in response to sending the determined route plan to one or more nodes, wherein the new route plan is generated based on order value threshold and wait time estimate associated with the node. The system is further configured to optimize the generated new route plan of the node to obtain an optimized new route plan, wherein the optimization comprises computing a new order value occupying a new order slot from the list of orders of the node in parallel to change in status of order value of the one or more nodes.

In yet another embodiment, one or more non-transitory machine-readable information storage mediums are provided. Said one or more non-transitory machine-readable information storage mediums comprises one or more instructions which when executed by one or more hardware processors causes determining, by a multi-route robot planner, a route plan of a node based on an order value associated with the node, wherein the order value is a measure of distance from the node to one or more nodes in a network, occupying an order slot from a list of orders of the node. The method further includes sending, by a multi-route robot planner, the determined route plan of the node to the one or more nodes in the network. The method further includes generating, by a multi-route robot planner, a new route plan, in response to sending the determined route plan to one or more nodes, wherein the new route plan is generated based on order value threshold and wait time estimate associated with the node; and the method further includes optimizing, by a multi-route robot planner, the generated new route plan of the node to obtain an optimized new route plan, wherein the optimization comprises computing a new order value occupying a new order slot from the list of orders of the node in parallel to change in status of order value of the one or more nodes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
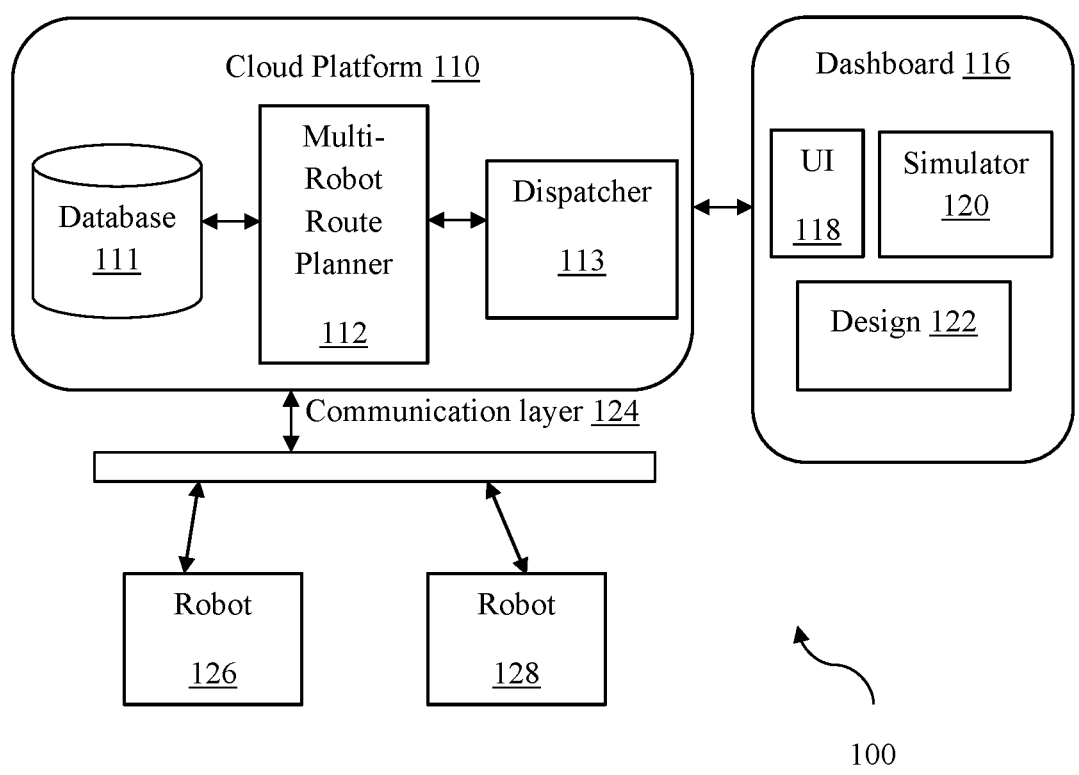
FIG. 1 is a block diagram illustrating a computer-implemented system for optimizing multi-robot route plan, in accordance with some embodiments of the present disclosure.

Exemplary embodiments are described with reference to the accompanying drawings. In the figures, the leftmost digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments. It is intended that the following detailed description be considered as exemplary only, with the true scope and spirit being indicated by the claims (when included in the specification).

Embodiments of techniques to generate and optimize route plans for multi-robot are described herein. Typically, path planning or navigation planning uses a sequence of valid configurations that moves the object from the source to destination. The term is used in computer animation, robotics, computer games and computational geometry. For example, consider navigating a mobile robot inside a building to a distant waypoint. It should execute this task while avoiding walls and not falling down stairs or in case of multi-robots, another robot. A motion planning algorithm would take a description of these tasks as input, and produce the speed and turning commands sent to the robot's wheels. Motion planning algorithms might address robots with a larger number of joints (e.g., industrial manipulators), more complex tasks (e.g. manipulation of objects), different constraints (e.g., a car that can only drive forward), and uncertainty (e.g. imperfect models of the environment or robot). Motion planning has several robotics applications, such as autonomy, automation, and robot design in CAD software, as well as applications in other fields, such as animating digital characters, video game, architectural design, robotic surgery, and the study of biological molecules.

There may be scenarios where things may not go as per the plan of a warehouse entity (for example, warehouse manager). In one embodiment, consider a robot as an autonomous vehicle. For example, the things that may not go as per the plan may be a breakdown of the robot, dynamic obstacles, robots slowing down, inaccurate characterization of the robot's properties, incorrect estimation of robot's speed, whether one or more robots can fit in certain places or if the space is too small or constrained for the robots to navigate, etc. The system may provide many strategies to solve the aforementioned scenarios. For example, suppose there is an impossible scenario, like a blockage due to multiple robots assembling at a particular zone. In such a case, the system may move some of the robots from that zone to other warehouse areas. The moved robots may not complete the task at a specific moment in time. However, the system's decision making solves the problem related to impossible scenarios (blockage due to multiple robots) and generates a best-effort solution.

Various embodiments of the present disclosure provide system(s) and method(s) for multi-robot route planning to overcome the above scenarios in an operating environment like a warehouse. In other words, the present disclosure proposes a multi-robot route planning system and method based on an order value. The order value may be a number that determines the order in which robots travel over a node. Each of the order values associated with a node may be termed as a bid value. The bid value is associated with cost, for example, if a robot is scheduled to traverse from source node (one node) to destination node (another node) via an edge, then measure of distance to traverse through the edge between the nodes is termed as bid value for traversing through the edge. The present method provides an optimization process of generating a multi-robot route plan using path search where information related to the order value is shared amongst two or more systems. Also, the optimization process eliminates cyclic dependency by avoiding deadlock situations, by dynamically and continuously broadcasting information related to bid value. The broadcasting of information helps in an emergent behavior of the system since there is minimum exchange of messages/communication between systems.

Embodiments of the present disclosure provide a decentralized architecture of multi-robot route planner and path synchronization mechanism. The route planner optimizes the route plan by iteratively re-computing an order value based on total order threshold and wait time estimate of a node, for example, the total estimating a total order value associated with a robot for navigating from a start node to the destination node. An optimal route is determined by the robot using optimized route plan via paths search. The optimal route may be having a least total order value and a least wait time estimate based on the estimated total order value to navigate from the start node to the destination node. Further, the robot may re-evaluate the determined path associated with the robot based on the change in status of the total order value associated with the robot in parallel to the total order value of the one or more robots. Planning and optimization of multi-robot route planning is further described in detail with respect to FIG. 2-5.

It is understood that the present disclosure refers to various terms that are interchangeable and may be used in one or more embodiments interchangeably. For example, the term 'nodes' may be interchanged by 'junctions' or 'tree element' or 'graph element' without any change in the scope or implementation of the invention. Such interchange may not be considered limiting and such interchanges are considered within the scope of the invention. In one embodiment, it is understood that an autonomous vehicle may be referred to as a node in the operating environment, such that the autonomous vehicle may be one or more of parked at the node, waiting at the node, traveling via the node, stopped at the node, completed navigation at the node, etc. It is also understood that the terms 'route', 'route plan,' 'trajectory', 'travel plan', ' navigation plan,' etc. may indicate the same term and are used at different places as per the use case scenarios. It is understood that the execution of one or more process steps leads to an output which is a result of the execution of the process step.

The technologies described herein are related to a robust cloud platform that optimizes route plans. In an exemplary embodiment, the platform utilizes multiple data structures to represent the operating environment, generates route plans, and allows optimized movement of the vehicles from one node to another node. The platform provides various techniques for analyzing the one or more generated route plans for critical scenarios, like cyclic dependency between two or more robots. While analyzing one or more generated route plans, the platform may apply heuristics, cost functions, metrics, etc. to identify new route plans that may plan path iteratively and dynamically. In an exemplary embodiment, while analyzing the one or more generated route plans, the platform may dynamically create or delete a plurality of destination nodes when determining that one of the route plans between nodes may lead to cyclic dependency. The created plurality of nodes may be used by the platform to generate an alternate route plan to avoid a deadlock or use cost functions to generate a better route plan. In an exemplary embodiment, the system or cloud platform may utilize one or more or combination of multiple techniques or data comprising speed scaling, up sampling, passive paths, parkable nodes, non-overlapping nodes, priority metrics, time penalty, etc. for analyzing and optimizing the route plans. The system may then distribute the optimized route plans to one or more autonomous vehicles. A detailed description of the above-described system and method for multi-robot route planning is shown with respect to illustrations represented with reference to FIGS. 1 through 6.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a block diagram illustrating a computer-implemented system for multi-robot route planning, according to an embodiment. In one embodiment, the objective of system 100 is to provide multi-robot navigation and reduce the dependency of the robot without collision checking. The system 100 may comprise one or more processing devices and storage devices that include computer-readable instructions executed by processing devices for optimizing route plans. The system 100 comprises a cloud platform 110 that may be considered on-demand availability of computer system resources with/without the user's direct active management. The cloud platform includes one or more processors and memory to generate and store the route plans or trajectories. In one embodiment, the cloud platform 110 includes a database 111 for storing the route plans or trajectories and related data for generating the route plans, as discussed herewith. In one embodiment, the related data may be a device's state information, statistics, other information related to navigation, traversing trees or graphs, preconditions, route tables, etc. The cloud platform 110 includes a multi-robot route planner (mrrp) 112, which includes one or more processors and memory to perform the primary task related to optimizing route plans without time dependency and without checking for collisions. In one embodiment, the mrrp 112 may act as a server, a system, an equivalent device, software, or a hardware component, for performing various tasks related to route planning. The mrrp 112 has been shown as a module of cloud platform 110 for representation and simplicity purposes. However, mrrp 112 may act as a component of any other system or platform involved in the tasks related to route planning. The cloud platform 110 includes a dispatcher 113 whose primary function is task assignment and decides which autonomous device should perform specific tasks and at a particular time. The dispatcher module communicates details related to the task on the communications layer 124 to one or more autonomous devices that know the destination and the task to be performed at the given time. The autonomous device is then programmed to interact with the mrrp 112, via the communications layer 124. The system 100 also includes a dashboard 116 that may be used for receiving inputs, like obstacle maps, graphs, tree structures, any other relevant inputs, and for displaying maps, representations like graphs, trees, simulated environments, etc. The dashboard 116 may include UI 118, simulator 120, and a design 122 for various functions related to multi-robot route planning and other tasks related to autonomous vehicle functions, like instructing the autonomous vehicle to move from one location to another on a map or a UI, etc. The UI 118 may be used to receive obstacle maps or other inputs related to route planning. simulator 120 provides a simulation environment that includes a map to represent the autonomous devices' navigation path in an operating environment. The system 100 supports heterogeneous autonomous devices like a plurality of robots for example, robot 126 and robot 128.

Described herein are various technologies pertaining to optimizing route plans. The system comprises a cloud platform that includes a multi-robot route planner. The multi-robot planner comprises one or more components related to an operating environment, like a warehouse, construction site, or a hospital. In one embodiment, the nodes may be considered as regions of space in the operating environment. The multi-robot planner comprises multiple modules that plan one or more routes as a best estimate. The modules may analyze one or more route plans for critical decision-making scenarios, for example, minimizing congestions or no check on collisions. After the modules analyze the route plans, the system utilizes the multi-robot route planner to optimize route plans based on the analysis. The optimized route plans are distributed to one or more autonomous vehicles.

The operating environment may include a warehouse, hospitals, construction sites, offices, dockyards, shipyards, roads, rails, etc. The simulator 122 may also be used to instruct the autonomous devices to perform certain tasks to optimize route plans for multi-robot path navigation and planning. One of the instructions may include providing priorities or parameters that may impact one's robot's navigation over another, etc. The design 122 may provide a design environment to edit the inputs, like obstacle maps and provide customized status information, for example, inputs like the potential for dynamic collisions at a particular time, for example, the arrival of certain autonomous devices, like driverless cars, at a traffic junction at a particular time or day based on traffic conditions at the particular time or day. The inputs or instructions may be provided by any component of dashboard 116 or other components of system 100, for example, warehouse management system or control system. In one embodiment, a warehouse management system or control system may be configured to interface with components of cloud Platform 100 for coordinating with autonomous devices and generating multi-robot route plans. The coupling of various external or internal components may be via or communications layer 124 or by any other non-limiting means of communications. The communications layer 124 may be customized to allow customers or other stakeholders to integrate their robotics software or hardware for customized robotics solutions. One or more functionalities of the system 100 and components thereof, is further explained in detail with respect to FIGS. 2-5.

Figure 2:
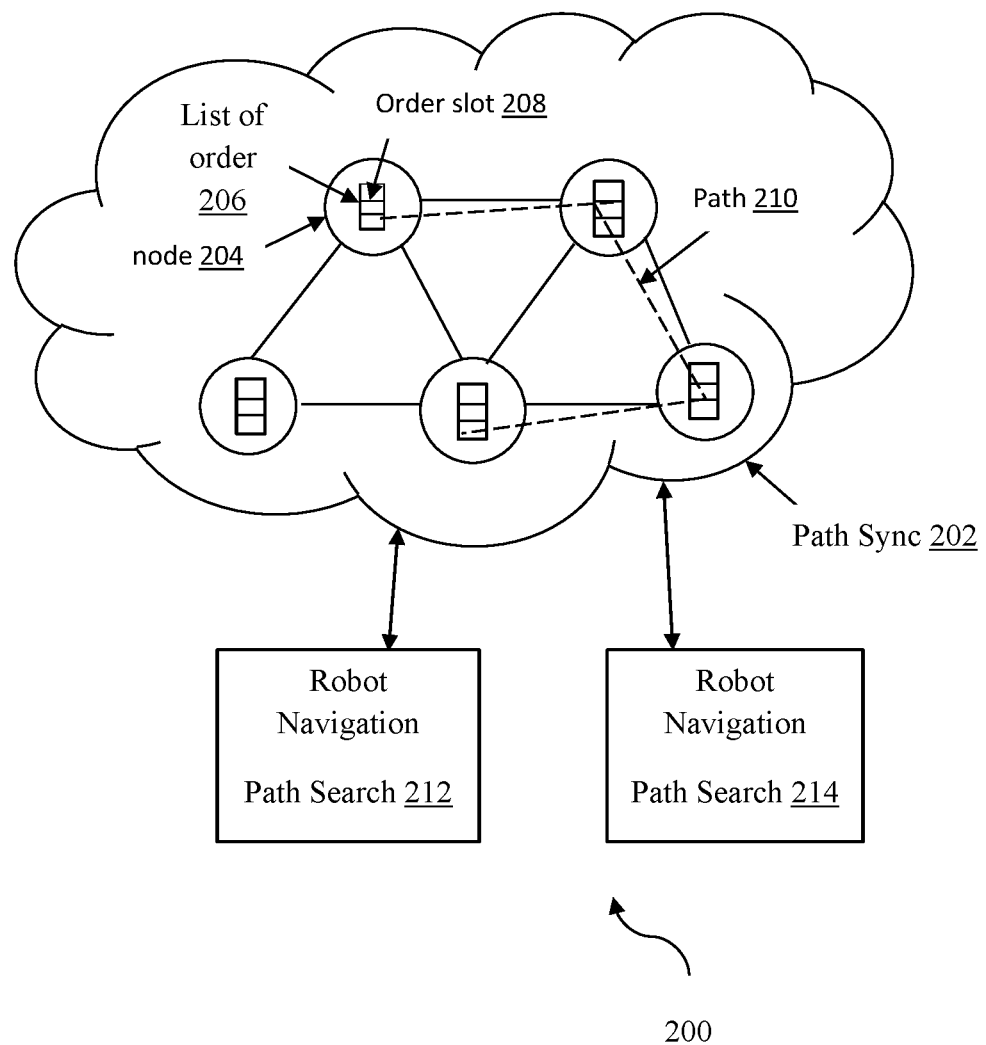
FIG. 2 illustrates an architecture of the multi-robot route planner, in accordance with some embodiments of the present disclosure.

FIG. 2 illustrates an architecture of the multi-robot route planner, in accordance with some embodiments of the present disclosure. In one embodiment, an architecture of the multi-robot route planner may include a navigation map generator, i.e., path sync 202. The path sync 202 is a representation of a graph or navigation map containing one or more nodes in a region of free space traversing in a network. For example, as shown in FIG. 2, node 204 is represented in a circle containing a list of order 206. For illustration purposes only three order slots are shown in FIG. 2, there may be a plurality of order slots. In one of the embodiments, each of the nodes in the graph includes a list of order or list of bids. The list of bids may include a plurality of order slots, for example, an order slot 208 or bid slot. The list of orders 206 includes information related to the price of the bid and node for which a bid is determined. Every single node in a network represents a list of bids including information related to bid price of a node, price of each of the bid slot and node for which a bid is determined. A path 210 is a trajectory of a node connecting/traversing to another node in the network. The trajectory is represented by a dotted line connecting one bid slot to another bid slot. In one embodiment, the path 210 represents the list of bids including information related to a node that is offering the bid and what is the bid price offered by the node. Herein, the cost or price of the bid determines the path 210 or distance travelled between the node. In the present architecture, the path sync 202 synchronizes data structure amongst a plurality of robots.

In one implementation, the path sync 202 may include a distributed data structure synchronizing each node in the network, in turn synchronizing robots by continuous broadcasting/updating data during the path search. In this implementation, each of the robots plans an optimal route using the map/graph generated by the mrrp 112 of FIG. 1. The path sync 202 may be a decentralized interface broadcasting information related to synchronization of the graph. The broadcasted information may include but not limited to current status of the determined optimal route, progress of determined optimal route based on the change in decision/situation of each of the nodes in the network. In another implementation, path sync 202 may be a centralized system, where each robot contacts a central system and receives information related to the map/graph generated. The centralized system generates a map with a centralized server in which each of the nodes receives information related to other nodes and updates each of the systems whenever the system contacts the server. In one embodiment, the path sync 202 may be one or more interfaces as defined in this disclosure, where a plurality of robots communicates with the one or more interfaces. In the decentralized path sync 202, each of the robots is bidding and planning an optimal route simultaneously based on the broadcasted information of each of the nodes to the one or more nodes in the network. For example, while a first robot is determining a bid slot of a node, there may be an update from a second robot with a higher bid that the first robot, in such scenario the first robot may need to dynamically replan or re-evaluate the optimal route determined before and/or after receiving the updated information from the second robot. During bidding and planning process each of the order slots is occupied associated with an order value and highest order value occupies a first slot. The mechanism of bidding, unlike a traditional bidding, is not binary. The robot which out bids the other robot occupies the first bid slot, moving up from a lower bid slot. As soon as another robot out bids the slot, the robot leaves the slot and occupies another slot based on the decision made by the robot. Hence the process does not end with winning or losing a bid slot, rather a continuous process of occupying and retracting the bid slot based on change in status of each of the node. The order or chronology of the bids may be determined based on price of the bid or bid value, unlike the based on conventional timestamp/time progression. When the first robot outbids the second robot, the second robot slows down and waits for the right decision for the second robot. The path search here represents the node and cost associated with the node. For example, a first robot may not occupy the first bid slot unless it is the highest bid, so the first robot may occupy a second slot. When the first robot bids the highest and occupies the first slot, it retracts previous bid and traverses through the node, thereby a second robot waiting on the second or third slot may occupy the first slot. Hence the path search and traversing mechanism is based on the node and cost associated with the node.

In this example, the robot may be a system or a device. The system may include an abstraction layer with path search being the top most layer of a robot navigation. In one embodiment, the abstraction layer may include a lower layer for controlling the speed of a robot and providing information on movement of the robot, for example, how to move forward, how to reach from one point to point another in a network by providing coordinates and by avoiding local obstacles, information on speed limit and the like. The navigation layer or path search layer may provide information related to avoiding other robots, calculating length of the path, graph search and information related to logical navigation decisions. In one embodiment, for controlling the autonomous behavior of the robot, a separate user interface may be provided \as per the application requirement, for example, before the work shift in the warehouse, may provide a list of tasks, that includes objects to be picked from various aisles or zones in the warehouse and then, dropped to a destination point. This could also be input in any document format, for example, a spreadsheet format (input.xls file), to the system.

As shown in FIG. 2, robot navigation path search 212 and 214, analyzes the generated route plans, optimizes route plans and re-evaluates the generated optimal routes. In FIG. 2 and as described herewith, only 2 robots have been considered for simplicity and for understanding purposes. However, the present invention is not limited to the number of robots and the type of robots. The path search includes estimating a total order value associated with a robot, from the one or more robots, for navigating from a start node to the destination node. The optimized route plan is received by one or more robots in an operative environment, where each of the robots determines an optimal route based on the robot's application or user defined services. Determining the optimal route is based on a least total order value and a least wait time estimate based on the estimated total order value to navigate from the start node to the destination node. For example, a robot with a high priority task may propose a higher bid value and at the same time saves the wait time by cutting down the waiting time at a bid slot and moving faster across the list of bid slots. Herein, the optimal route is defined by the least total bid value, that is the fastest route/distance traversed by the robot to reach the destination node. While determining the optimal route plan based on the least total order value and a least wait time estimate, the robot may receive information related to other robots in the operative environment traversing through the nodes. Based on the information received, the robot may re-evaluate the determined path based on the change in status of the total order value associated with the robot in parallel to the total order value of the one or more robots. For example, the optimal route plan determined by the robot in the previous step may not be the best solution when another robot bids higher than the order value of the robot. Again, the robot re-evaluates the optimal route plan in light of the change in status of the other robot and determines the best solution corresponding to cost threshold and wait time estimate associated with the robot. The visualization of the aforementioned optimization process between two or more robots is further described in detail in FIG. 3 with respect to a graph.

Figure 3:
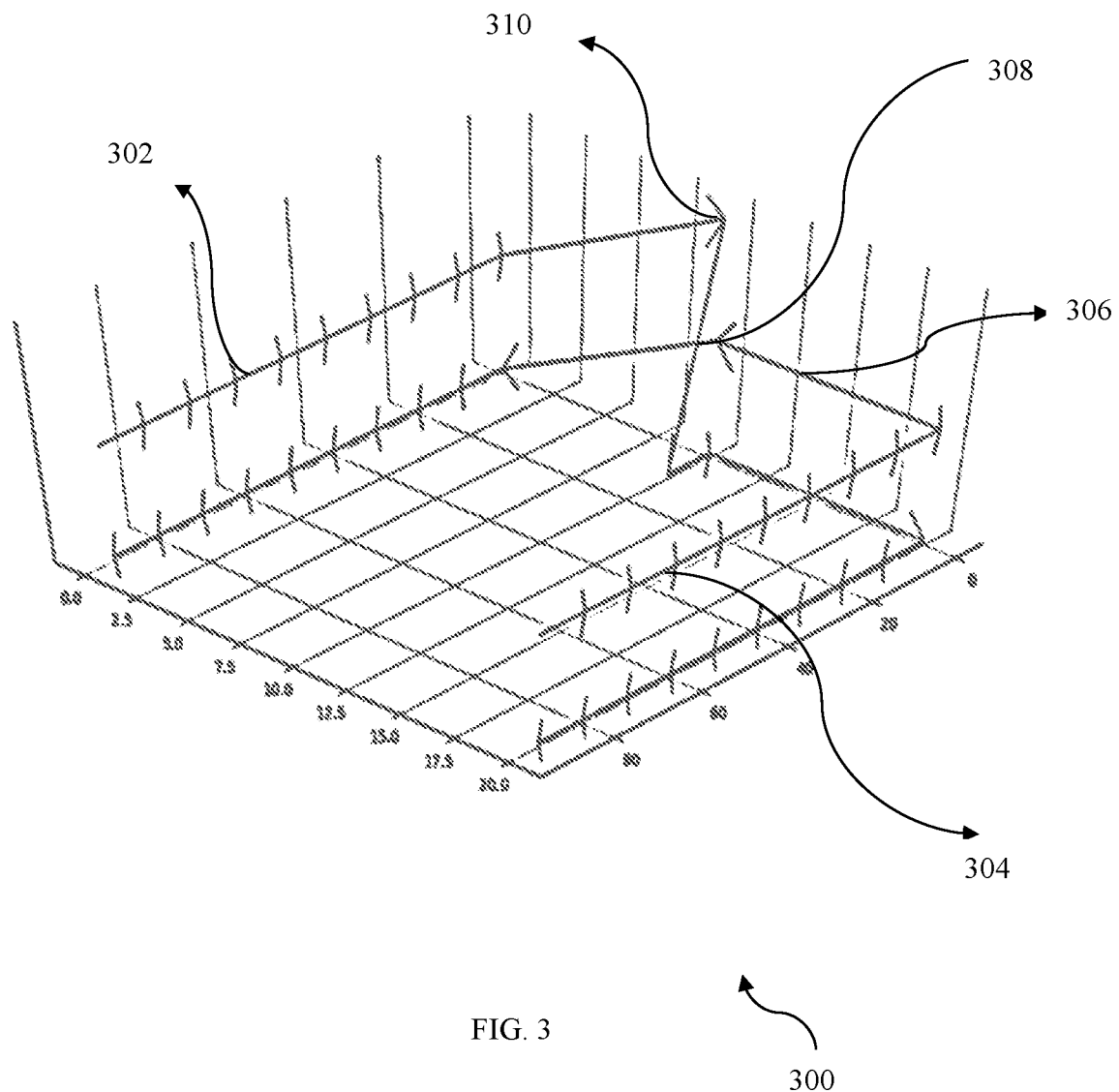
FIG. 3 is an exemplary visualization of the resultant graph of the system architecture, in accordance with some embodiments of the present disclosure.

FIG. 3 is an exemplary visualization of the resultant graph of the system architecture, in accordance with some embodiments of the present disclosure. The resultant 3D graph is an exemplary output of the system architecture involving two systems/robots accessing the optimized route plan. The x-axis represents the price of the bid and the y-axis is the implicit flow of time. The output of the system architecture may also represent a time dependency graph of two or more robots operating in an environment. For example, as shown in FIG. 3, two separate lines are plotted illustrating two robot's trajectories with respect to price of a bid value and time flow. The first robot trajectory 302 and second robot trajectory 304 is running through the 3D graph with an arrow pointing in the direction of the trajectory. The trajectories 302 and 304 represent a list of bids of first robot and second robot respectively. Stop points of trajectories 302 and 304 are shown by arrows. In one embodiment, the first robot trajectory 302 has a higher priority and is plotted with higher bid values than the second robot's trajectory 304. At stop point 310, the first robot reaches a trajectory where the bid value is lower than the second robot and hence waits until the second robot's trajectory passes the stop point 308. In accordance with the present system architecture, as a rule at any given time, any two robots cannot bid the same bid value for the same node and hence forces one to wait, thereby eliminating the need for a collision check at each iteration. As shown in FIG. 3, the first robot waits at the stop point 310 and the second robot waits at the stop point 306. In this example, the bid slot for the second robot changes to a higher bid and gets the priority over the first robot and hence occupies the higher bid and traverses through a particular node, until then the first robot with a lower bid than the second robot waits for the second robot to traverse through the particular node.

As shown in the dependency graph of FIG. 3, the system follows a rule of no same node and no same bid at any given point amongst the two or more robots in the operating environment, thereby avoiding cyclic dependency between the robots. The present rule not only forces one robot to wait until the other traverses through the node, it also slows down the speed of a robot based on the cost threshold and wait time estimate associated with a node. For example, if a robot has a lower priority task assigned which has a higher wait time estimate and a relatively lower cost threshold, then such a robot may prefer to wait in a lower bid slot until the higher bid slot traverses. In another scenario, a robot may be assigned a higher priority task with lower wait time and hence such a robot may compute a higher bid value and occupy a higher bid slot and traverse through faster than the other robots. The decentralized architecture of the present system enables broadcasting and synchronizing information related to the bid value and bid slots of each of the nodes in the network.

Figure 4A:
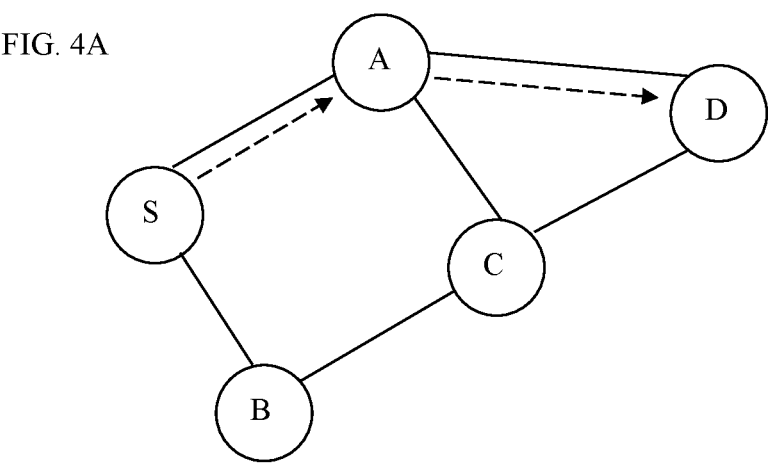
FIGS. 4A-4C is an exemplary non-limiting representation for optimizing route plans, in accordance with some embodiments of the present disclosure.
Figure 4B:
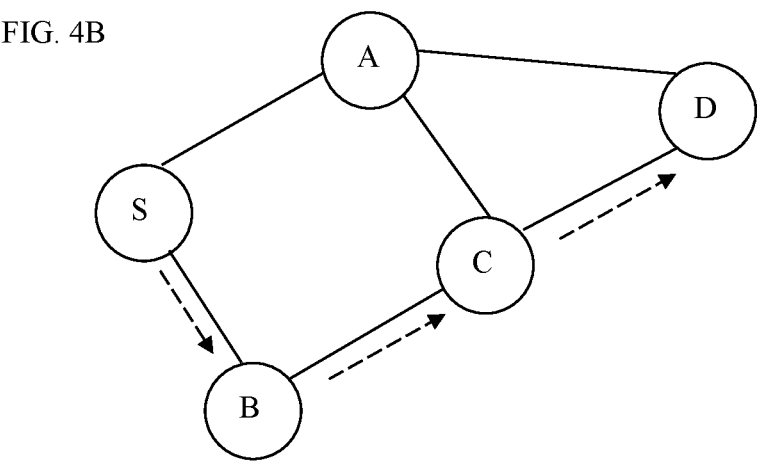
Figure 4C:
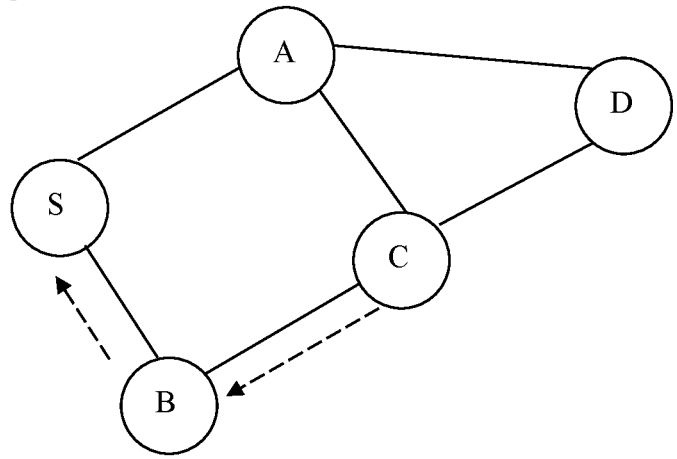

FIGS. 4A-4C is an exemplary non-limiting representation for optimizing route plans, according to some embodiments of the present disclosure. In one embodiment, each node in a region of free space is connected to one or more nodes (depicted by solid straight lines in FIGS. 4A-4C). In this example, at the start of the trajectory of a robot from start node S to destination node D, the cost of distance to be travelled is assumed to be zero. In general, the cost estimate value is always a non-zero number, since before the trajectory (traversing via a edge) the system of the device/robot is unaware of the actual cost estimate, and as an example, may be assumed to be zero. As shown in FIG. 4A, the cost estimate to traverse from any route via edges to the destination node D is zero. Once the robot traverses an edge, from node S to A, the cost of the edges is known to be at least 1. For example, the robot traverses from S to A assuming the cost is zero, however once the path is traversed, the cost estimate of the edge is known and now assumed to be 1 (non-zero number). Likewise, from node A to node D the cost estimate is assumed to be zero, but once the robot traverses through the edge, the cost is estimated to be 1. Now the robot from S to D knows the cost estimate to traverse from source node S to the destination node D. However, the system, in accordance with the present disclosure, runs the method steps to arrive at an optimal route for the robot. Herein optimal route relates to a situation and values suitable for a particular robot, for example order value threshold or cost threshold and wait time estimate. While traversing the edges, when the cost estimate increases, the system checks back with the other alternatives to arrive at the best possible route. Herein, the best route plan is the one which can be traveled fastest with minimum cost estimate as the cost estimate is built incrementally. In this example and as shown in FIG. 4B, the robot takes on the other route from source S to B and arrives at a cost estimate of 1, that is similar to the process in FIG. 4A. Further, as the robot traverses the path from node B to node C, the cost estimate is 1 and likewise from C to D is 1. The cost estimate of the distance from source node S to D via the path as shown in FIG. 4B is now known. The path is traversed back to check for the best route for a given situation of the robot. The system or the optimization algorithm of the robot traverses back (back tracking) the path as shown in FIG. 4C. While traversing back the path the cost estimate is incremented to 2 from node C to B. Similarly for node B to S the cost is incremented to 2 from traversing and back tracking the edge. Therefore, as a result of the incremental cost estimate, the system recomputes the cost estimate to arrive at an optimal route plan or optimized route plan. Meanwhile, the system or the robot in this case, continuously receives information on the cost estimate of other nodes traversed by one or more robots. In one embodiment, if the situation around the route plan changes mid-way of path search for a robot, the system re-computes the arrived optimal route based on the changed situation or current situation of the one or more robots (i.e., current bid value/bid slot of a node). The iteration of re-computing the best route terminates once the criterion is satisfied. In one embodiment, the predetermined criterion may include traverse cost, that is the cost for traversing an edge, cost estimate of a node from start to destination node and price of each of the bid slots within the node. Based on the criteria, the optimization process for the optimal route terminates and the robot traverses the optimal route to reach the destination node.

Figure 5A:
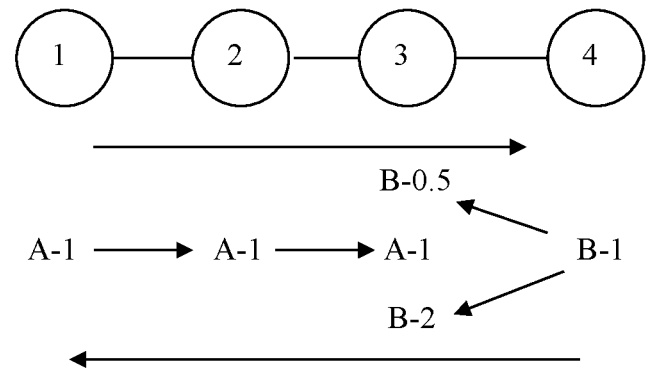
FIGS. 5A and 5B, illustrates an exemplary optimization process for two robots, in accordance with some embodiments of the present disclosure.
Figure 5B:
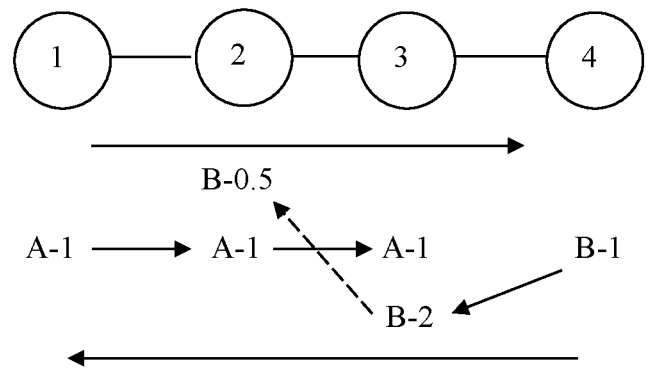

FIGS. 5A and 5B, illustrates an exemplary optimization process for two robots, in accordance with some embodiments of the present disclosure. In one embodiment, robot A and robot B are traversing a path from one node to another. As shown in the FIGS. 5A and 5B robot A is traversing a path from node 1 to node 4 and robot B is traversing a path from node 4 to node 1. For example, robot A bids a value of 1 and occupies an order slot from the list of orders for nodes 1, 2 and 3. The bid values are denoted as A-1 in the FIGS. 5A and 5B. In the same example, robot B may traverse through node 4 to node 3 by either bidding a higher or a lower bid value than robot A's bid value for each of the node 3, 2 and 1. The start position for robot B is node 4 and robot B's bid value for node 4 is B−1 and for node 3 it may either have a bid value of B−0.5 or B−2 as shown in the FIG. 5A. For example, if robot B chooses to offer a bid value of B−0.5, then robot B waits for robot A with a bid value of A−1 at node 3. In other words, in one embodiment, robot B may determine a bid value lower than the bid value of robot A at node 3, indicating a longer wait time estimate for robot B. In alternative embodiment, robot B may determine a bid value higher than the bid value of robot A at node 3 indicating a high priority or lower wait time estimate and a higher bid value. In either of the scenarios, the decision is based on the cost threshold and wait time estimate in parallel to the other robot. When robot A bids a value of A−1 for node 1, 2 and 3, the information related to the node for which the bid is offered, the bid slot occupied and bid value for the occupied slot is broadcasted to other robots including robot B. In other words, robot B before offering a bid value for node 3 receives the information related to robot A's bid, thereby making an optimal route plan decision in parallel to the robot A's bid.

In one embodiment, as shown in FIG. 5B, robot B may be traversing from node 4 to node 3 by a bid value of B−2. Herein, robot B has a priority on robot A's bid value of A−1 and hence, robot A waits in slot A−1 until robot B with slot B−2 passes. However, for example, if robot B bids an order value of 0.5 and occupies an order slot of B−0.5 at node 2, then B−2 is dependent on A−1 traversing from node 2 to node 3. Since A−1 has a higher priority over robot B's bid slot of B−0.5, robot B may wait at the B−0.5 slot until robot A having an A−1 slot passes the node. However, A−1 is dependent on B−2 to traverse from node 2 to node 3, since B−2 is at higher priority than A−1. In this example, A−1 is dependent on B−2 and B2 is dependent on A−1 thereby creating a cyclic dependency between two systems. In accordance with present disclosure, the cyclic dependency scenarios are eliminated by dynamically and continuously broadcasting information on order value of each of the nodes traversed by the robots. For example, at the start of the process of traversing from node 4 to node 1, robot B may or may not receive information associated with robot A. However, once robot B receives information shared by robot A's bid value, bid slot and bid node, robot B saves the information in the database, such that any deadlock situation/cyclic dependency is avoided by re-evaluating the determined route plan based on the shared information by robot A. In the present example, as shown in FIG. 5B, the dotted line represents a path traversing from node 3 to node 2 by moving from slot B−2 to B−0.5 which is against the rule of optimization. In one embodiment, the cost of traversing to node 3 to node 2 may be considered as infinity by robot B which exceeds the cost threshold of B and thus, robot B cannot bid a value to occupy a bid slot from B−2 to B−0.5. Also, once a node is disabled (where the cost is considered infinity), the information is broadcasted to one or more robots such that the disabled nodes are avoided for planning an optimal route by one or more robots.

In one embodiment, the present disclosure provides a dynamic optimization route planning process for two or more robots. The present disclosure provides a system and method including a continuous change in bid value, generated graph and situation around a node. In one embodiment, the system analyzes the route plans based on graph properties like a passive path and a non-parkable node. The system may use one of the techniques related to avoiding congestion issues. The system applies heuristics to resolve congestion. The heuristic is to identify nodes in the map where the traffic may be heavy and designate the node as non-parkable. Based on the heuristic analysis, the system may optimize the route plan to not include stopping or waiting at those non-parkable nodes. As the autonomous vehicles converge at the non-parkable nodes, the system updates, replans, or optimizes the route plans with passive paths to take a detour, not stop, or wait at those nodes. The system avoids blocking pathways and takes precautionary measures so that the vehicles do not cause congestion.

In one embodiment, the system analyzes the route plans based on graph properties like non-overlapping nodes. When graphs are designed, the robots have to wait in the nodes. So, the assumption is that the nodes in the graph may not overlap. Every single node has a property defining the amount of space occupied by the node. For example, consider a node's representation as a geometric shape, a circle. It is understood that if there is a robot somewhere in a first node and another robot is at a different place in a second node, then the space occupied by those regions do not overlap. Hence, the nodes are non-overlapping. The system assumes that if a robot reaches a node, then the robot is within the node and not interfering with other robots/humans in other nodes. This helps the system be more efficient and avoid scanning the other nodes. The system considers a robot waiting inside a node as not interfering with the other robots moving around it. Hence, that mandates that the nodes may not be overlapping with other nodes in the operating space.

In one embodiment, two or more robots receiving the optimized generated route plan may perform a multi path search. For example, iteration of arriving at an optimal route is based on round robin route planning, where a first robot determines a route plan and a second robot may determine a route plan which changes the situation for the first robot. In such situations, the first robot may have to re-plan the route based on the second robot's decision. For example, the process may go back and forth sequentially. In another example, depending on the processor time associated with each of the robots, it may be non-sequential. In the optimization process, as soon as an optimal route is determined by the first robot, it may change immediately based on the current status of the other one or more robots. In such scenarios, the decision of choosing the determined optimal path or determining a new optimal path falls back on the first robot. In the second iteration, the first robot may backtrack the optimal path or an alternative path based on the other one or more robots and if the decision related to one or more robots does not affect the first robot's decision, the first robot continues with the optimal route plan. On the other hand, one or more robots' decision is not affected by first robot's optimal route plan, then one or more robots continuous with the iteration or arrive at a decision, thereby first robot and one or more robots arrive at an optimal route plan by terminating the iteration of re-planning respective optimal routes. In another embodiment, if one or more robots' bids are higher than the first robot, then the first robot needs to re-plan the optimal route by considering factors like wait time estimate, cost threshold, bid associated with each of the slots and the like. For example, the factors may be conditioned, like for example, if the first robot can wait till the one or more robots move, if it is worth bidding higher than the one or more robots again, or an alternative route plan is to be determined etc. The conditioned factors may facilitate in arriving at an alternative solution than the originally planned optima route. The iterative process of optimization leads to re-computing the bid value and arriving at a new solution, if the previous solution is not satisfied in light of the one or more robot's decision. Also, since the cost threshold is not infinity, the solution does not lead to a deadlock situation and hence forces a robot to arrive at an optimal decision keeping in the preconditions in check. Once the cost threshold exceeds, the node will take a passive route and drop out of the network.

In one embodiment, if a path is passive and there are non-parkable nodes, then the system, in some scenarios, may optimize the route plan to not allow the robots traveling on passive routes to target the non-parkable nodes as the destination. Consider a safety scenario related to fire gates. When the fire alarm sounds, the system automatically closes the fire gates, and all the system components are instructed to stop all tasks and move into an idle state. However, one of the concerns in such critical scenarios may be that a robot may just stop under those fire gates due to the system's instruction to stop. This may lead to blocking the fire gates, and the gates may not be able to close down, which may lead to a fire hazard, which is considered a critical risk. This scenario may also cause damage to the robot. The system analyzes the route plans for the warehouse's critical scenarios and marks the node coinciding with the fire gate as no parking when the robot reaches the non-parking node. The route is then optimized based on the analysis, and instead of stopping, the robot requests a passive route. If the robot is at a parkable node, then the robot halts and stays where they are. However, if the robot is not at a parkable node, then the robot moves to the closest parkable node. The system enables the optimal generation of route plans to handle critical scenarios. The critical scenarios may comprise collisions, fire hazards, clogging the traffic, damages, safety hazards, performance that may impact the productivity, utilization, efficiency of the warehouse, or the robots, etc. In one embodiment, consider a scenario, like one-hour sale, or prime day sale, or discount day sale, the performance of robots in a warehouse impacts the business. Hence, the performance by the robot during such time periods may be considered as a critical scenario.

Figure 6:
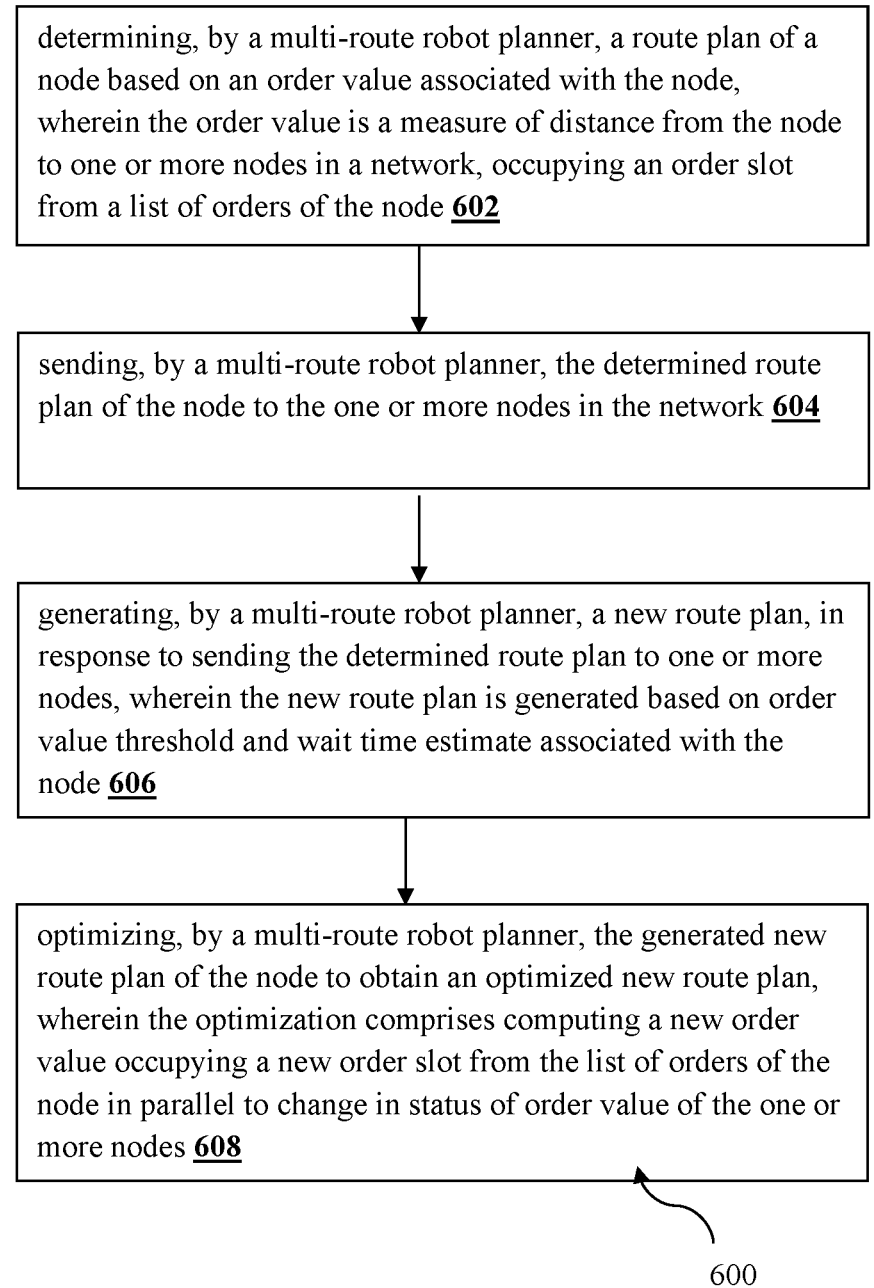
FIG. 6 is a flow diagram illustrating a method for multi-robot route planning, in accordance with some embodiments of the present disclosure.

FIG. 6, illustrates a flow-diagram of a method 600 for multi-robot route planning, in accordance to some embodiments of present disclosure. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communication network. The order in which the method 600 is described is not intended to be construed as a limitation, and any number of the described method blocks can be combined in any order to implement the method 600, or an alternative method. Furthermore, the method 600 can be implemented in any suitable hardware, software, firmware, or combination thereof. In an embodiment, the method 600 depicted in the flow chart may be executed by a system, for example, the system 100 of FIG. 1. The method 600 of FIG. 6 will be explained in more detail below with reference to FIGS. 1-5.

Referring to FIG. 6, in the illustrated embodiment, the method 600 is initiated at 602 where the method includes determining, by a multi-route robot planner, a route plan of a node based on an order value associated with the node, wherein the order value, is distance travelled from the node to one or more nodes in a network, occupying an order slot from a list of orders of the node. For example, as shown in FIG. 2, each of the nodes includes a list of orders containing a plurality of order slots. Based on the predefined cost estimate and wait time estimate, a route is determined for a node to one or more nodes. The order value determines the distance to be travelled by the node to one or more nodes and occupying order slots from the plurality of order slots. For example, a higher order value will occupy the upper most order slot unless another node bids a value higher than the previously high bid value. Likewise, the next highest order value occupies the second highest slot from the plurality of slots. Each of the order values offered to bid is determined based on cost threshold and wait time estimate associated with the node. In accordance with present disclosure, the bid may be a number that determines the order in which robots travel over a node and computing optimal routes. The heuristic for the bid price is to set it equal to the cost of the second-best alternative (the decision boundary). The cost threshold is user defined and essentially terminates the cost optimization/computations process when the threshold is exceeded. The terminated process follows a fallback destination by determining a possible next order slot, for example, a slot. in another node that is reachable via graph edge, from the node of the current slot. The process of fallback destinations eliminates the circular dependencies of existing route plans. Further, wait time estimates may be user defined based on urgency of a task.

At 604, the method includes sending the determined route plan of the node to the one or more nodes in the network. The determined route plan of the node is broadcasted to the one or more nodes in the network. Based on the broadcasted route plan of the node, the one or more node determines a route path corresponding to each of the one or more nodes. The broadcasted information may include a traverse cost, cost estimate of a node and price of a bid slot (base price). The traverse cost is the bid cost for traversing from one node to another (herein, traversing via edge from one node to another). The cost estimate of a node is the cost of a node from a start position to destination node. The base price may include a price estimate of a bid to be offered to occupy a bid slot from the list of bid slots. The information is continuously broadcasted to one or more nodes in the network such that each of the nodes is synchronized and dynamically plan and re-plan an existing route path to arrive at the best estimate. The continuous broadcasting information eliminates multiple communication (sending multiple messages back and forth) between the nodes in the network. Since the information is received at every step, when a route is replanned, it may start with broadcasted information stored in the system rather than with no information. Also, since the situation around a node change dynamically, bid values and cost estimate of current path search may change and hence the process of bidding and planning is a simultaneous process of the system/device.

At 606, the method includes generating, by a multi-route robot planner, a new route plan, in response to sending the determined route plan to one or more nodes, wherein the new route plan is generated based on order value threshold and wait time estimate associated with the node. A new route plan is determined based on the broadcasted information amongst the one or more nodes. Since information related to traverse cost, cost estimate of the node and base price of a slot in the node is continuously broadcasted to one or more nodes in the network, each of the node in the network dynamically plan and re-plan an existing route path to arrive at the best estimate. The re-planning includes recomputing a bid value based on the cost threshold and wait time estimate associated with a node. For example, if a robot has a lower priority task assigned which has a higher wait time estimate and a relatively lower cost threshold, then such a robot may prefer to wait in a lower bid slot until the higher bid slot traverses. In another scenario, a robot may be assigned a higher priority task with lower wait time and hence such a robot may compute a higher bid value and occupy a higher bid slot and traverse through faster than the other robots. The decentralized architecture of the present system enables broadcasting and synchronizing information related to the bid value and bid slots of each of the nodes in the network.

At 608, the method includes optimizing, by a multi-route robot planner, the generated new route plan of the node to obtain an optimized new route plan. The method of optimization includes computing a new order value occupying a new order slot from the list of orders of the node in parallel to change in status of order value of the one or more nodes. The new route plan generated is further optimized based on synchronized information amongst one or more nodes in a region of free space. The steps of optimization include determining an order value by the node in parallel to order values of the one or more nodes, wherein the order value is different from the order values of the one or more nodes. The determined order value is broadcasted by the node to the one or more nodes. Based on the broadcasted information a new route plan is updated by recomputing the order value based on change in the order values of the one or more nodes. The recomputing of the order value is based on cost threshold and wait time estimate associated with the node. In one implementation, determining the order value by the node is based on the total order cost threshold associated with the node. Also, the total order cost threshold and wait time estimate determines the number of iterations of updating the new route plan. The cost threshold is user defined and essentially terminates the cost optimization/computations process when the threshold is exceeded. The terminated process follows a fallback destination by determining a possible next order slot, for example, a slot in another node that is reachable via graph edge, from the node of the current slot. The process of fallback destinations eliminates the circular dependencies of existing route plans. Further, wait time estimates may be user defined based on urgency of a task.

In one embodiment, present disclosure provides receiving the optimized new route plan by one or more robots and determining a path of one or more robots to a destination node via path search from the received optimized new route plan. The path search includes estimating a total order value associated with a robot, from the one or more robots, for navigating from a start node to the destination node. The optimized route plan is received by one or more robots in an operative environment, where each of the robots determines an optimal route based on the robot's application. Determining the optimal route is based on a least total order value and a least wait time estimate based on the estimated total order value to navigate from the start node to the destination node. The optimal route is defined by the least wait time estimate, for example, a robot with a high priority task may propose a higher bid value and at the same time save the wait time. Also, the optimal route is defined by the least total bid value, that is the fastest route/distance traversed by the robot to reach the destination node. While determining the optimal route plan based on the least total order value and a least wait time estimate, the robot may receive information related to other robots in the operative environment traversing through the nodes. Based on the information received, the robot may re-evaluate the determined path based on the change in status of the total order value associated with the robot in parallel to the total order value of the one or more robots. For example, the optimal route plan determined by the robot in the previous step may not be the best solution when another robot bids higher than the order value of the robot. Again, the robot re-evaluates the optimal route plan in light of the change in status of the other robot and determines the best solution corresponding to cost threshold and wait time estimate associated with the robot.

In one embodiment, the present disclosure also provides changing the destination node of the one or more robots based on wait time estimate and total order value associated with the node or creating a plurality of destination nodes based on wait time estimate and total order value associated with the node. For example, the destination node may be changed mid-way of route planning based on the change in the situation around the two or more robots planning an optimal route plan. In another example, a plurality of destination nodes may be created, if the robot reaches a passive route or estimates an infinity cost for a particular destination node, thereby the navigation may be carried out without interruption and at the same time satisfying the one or more pre-conditions of the robot liek cost threshold, wait time estimate, bid price etc.

In various embodiments of FIGS. 1-6, a method and system for multi-robot route planning is disclosed. The present disclosures solve technical problems in the field related to multi-robot route planning. The various embodiments described herein implement steps to eliminate time dependency and deadlock scenarios amongst two or more robots and to provide no collision check route planning. The present disclosure also provides a system and a method to handle unsolvable or impossible inputs, prevent deadlock scenarios at critical junctions, plan precautionary measures to avoid safety hazards in the operating environment, etc. while optimizing the route plans. Various technical advantages of the multiple embodiments described herein may also include optimizing space and computation, taking preemptive measures to avoid cyclic dependency between two or more robots while optimizing route plan and minimizing communication between devices. Present disclosure also includes enablement of a robust and flexible cloud platform that utilizes a multi-robot route planner to handle fleets of autonomous vehicles of different types, orientation, capabilities, size, or manufacturers to provide no collision check optimized route plans in a complex operating environment. Other technical advantages include representation of complex real-life scenarios in multiple data structures, reusing existing storage, and efficiently utilizing recently gathered knowledge via robust traversal techniques while optimizing the route plans with emergent behavior of the system architecture as a whole.

The foregoing diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of protocol(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid-state Random-Access Memory (RAM) or Read Only Memory (ROM) storage units and then stored in a compressed, non-compiled and/or encrypted format. In some embodiments, hard-wired circuitry may be used in place of, or in combination with, program code for implementation of processes according to some embodiments. Embodiments are therefore not limited to any specific combination of hardware and software.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

It is intended that the disclosure and examples be considered as exemplary only, those in the art will recognize other embodiments may be practiced with modifications and alterations to that described above.

What is claimed is:

1. A processor-implemented method comprising:
determining, by a multi-route robot planner, a route plan of a first node based on an order value associated with the first node, wherein the first node has a plurality of order slots each having an order value associated therewith, the order value is a measure of distance from the first node to one or more second nodes in a network and determines which order slot to occupy;
sending, by the multi-route robot planner, the determined route plan of the first node to the one or more second nodes in the network;
generating, by the multi-route robot planner, a new route plan, in response to sending the determined route plan to the one or more second nodes, wherein the new route plan is generated based on an order cost threshold and robot wait time estimate associated with the first node; and
optimizing, by the multi-route robot planner, the generated new route plan of the first node to obtain an optimized new route plan, wherein the optimization comprises computing a new order value of the first node based on a change in order value of the one or more second nodes.

2. The method of claim 1, further comprising:
receiving the optimized new route plan by one or more robots; and
determining a path of the one or more robots to a destination node via path search from the received optimized new route plan, the path search comprising:
estimating a total order value associated with a robot, from the one or more robot, for navigating from a start node to the destination node;
determining a path including a least total order value and a least robot wait time;
estimate based on the estimated total order value to navigate from the start node to the destination node; and
re-evaluating the determined path associated with the robot based on change in the total order value associated with the robot in parallel to the total order value of the one or more robots.

3. The method of claim 2, further comprising:
changing the destination node of the one or more robots based on the robot wait time estimate and total order value associated with the first node; or
creating a plurality of destination nodes based on the robot wait time estimate and total order value associated with the first node.

4. The method of claim 1, further comprising:
broadcasting an order value for each order slot of the plurality of order slots of the first node; and
determining an order slot from the order value based on a total cost estimate associated with the first node.

5. The method of claim 1, wherein if the order value associated with the first node is greater than other order value associated with the one or more second nodes, then the order value associated with the first node occupies a first order slot, and wherein hierarchy of the order slots of the first node is based on the order value.

6. The method of claim 1, wherein the optimizing further comprising:
determining an order value by the first node in parallel to order values of the one or more second nodes, wherein the order value is different from the order values of the one or more second nodes;

sending the determined order value by the first node to the one or more second nodes; and updating the new route plan by recomputing the order value based on the change in the order values of the one or more second nodes using the order cost threshold and the robot wait time estimate associated with the first node.

7. The method of claim 6, wherein proposing the order value by the first node is based on a total order cost threshold associated with the first node, and wherein the total order cost threshold and the robot wait time estimate determines number of iterations of updating the new route plan.

8. The method of claim 1, wherein the order cost threshold and the robot wait time estimate associated to the first node is predetermined based on an application.

9. The method of claim 1, further comprising:
removing the order value occupying the order slot of the first node from a list of bids, if the first node traverses from a destination node.

10. The method of claim 1, further comprising:
generating a passive route, if the first node reaches a maximum value of the order cost threshold, wherein the passive route is dropped out of the network.

11. A system comprising:
a memory storing instructions;
a processor coupled to the memory, wherein the processor is configured by the instructions to:
determine, by a multi-route robot planner, a route plan of a first node based on an order value associated with the first node, wherein the first node has a plurality of order slots each having an order value associated therewith, the order value is a measure of distance from the first node to one or more second nodes in a network and determines which order slot to occupy;
send the determined route plan of the first node to the one or more second nodes in the network;
generate a new route plan, in response to sending the determined route plan to the one or more second nodes, wherein the new route plan is generated based on an order cost threshold and a robot wait time estimate associated with the first node; and
optimize the generated new route plan of the first node to obtain an optimized new route plan, wherein the optimization comprises computing a new order value of the first node based on a change in order value of the one or more second nodes.

12. The system of claim 11, further configured to:
receive the optimized new route plan by one or more robots; and
determine a path of the one or more robots to a destination node via path search from the received optimized new route plan, the path search comprising:
estimating a total order value associated with a robot, from the one or more robots, for navigating from a start node to the destination node;
determining a path including a least total order value and a least robot wait time estimate based on the estimated total order value to navigate from the start node to the destination node; and
re-evaluating the determined path associated with the robot based on change in the total order value associated with the robot in parallel to the total order value of the one or more robots.

13. The system of claim 12, further configured to:
change the destination node for the one or more robots based on the robot wait time estimate and total order value associated with the first node; or
create a plurality of destination nodes based on the robot wait time estimate and total order value associated with the first node.

14. The system of claim 11, further configured to:
broadcast an order value for each order slot of the plurality of order slots associated with the first node; and
determine an order slot from the order value based on a total cost estimate associated with the first node.

15. The system of claim 14, wherein if the order value associated with the first node is greater than other order value associated with the one or more second nodes, then the order value associated with the first node occupies a first order slot, and wherein hierarchy of order slots of the first node based on the order value.

16. The system of claim 15, wherein the order cost threshold and the robot wait time estimate associated to the first node is predetermined based on an application.

17. The system of claim 11, further configured to:
determine an order value by the first node in parallel to order values of the one or more second nodes, wherein the order value is different from the order values of the one or more second nodes;
send the determined order value by the first node to the one or more second nodes; and
update the new route plan by recomputing the order value based on the change in the order values of the one or more second nodes using the order cost threshold and the robot wait time estimate associated with the first node.

18. The system of claim 17, wherein proposing the order value by the first node is based on a total order cost threshold associated with the first node, and wherein the total order cost threshold and the robot wait time estimate determines number of iterations of updating the new route plan.

19. The system of claim 11, further configured to:
remove the order value occupying the order slot of the first node from a list of bids, if the first node traverses from a destination node.

20. A non-transitory computer-readable medium having embodied thereon a computer program, the method comprising:
determining, by a multi-route robot planner, a route plan of a first node based on an order value associated with the first node, wherein the first node has a plurality of order slots each having an order value associated therewith, the order value is a measure of distance from the first node to one or more second nodes in a network and determines which order slot to occupy;
sending the determined route plan of the first node to the one or more second nodes in the network;
generating a new route plan, in response to sending the determined route plan to the one or more second nodes, wherein the new route plan is generated based on an order cost threshold and a robot wait time estimate associated to the first node; and
optimizing the generated new route plan of the first node to obtain an optimized new route plan, wherein the optimization comprises computing a new order value of the first node based on a change in status of order value of the one or more second nodes.

* * * * *